INVENTOR.
HENRY T. HSIA

United States Patent Office 3,115,746
Patented Dec. 31, 1963

3,115,746
HYDROGEN TRANSPIRATION COOLING OF A HIGH TEMPERATURE SURFACE USING A METAL HYDRIDE AS THE COOLANT MATERIAL
Henry T. Hsia, Sunnyvale, Calif., assignor to Lockheed Aircraft Corporation, Burbank, Calif.
Filed July 18, 1960, Ser. No. 43,402
1 Claim. (Cl. 60—35.6)

This invention relates to improved means and methods for cooling surfaces which are to be subjected to very high temperatures.

The lack of materials and/or cooling methods capable of accommodating ultra-high heat-transfer rates encountered in rockets, missiles, space vehicles and related devices is a major technological problem which is still to be overcome. This problem is particularly acute with regard to the design of nozzles for solid propellant rockets because of the severe temperatures and gas flow conditions to which such rocket nozzles are subjected. It will be appreciated, therefore, that truly superior materials and/or cooling techniques will be necessary in the design of such rocket nozzles if their inner aerodynamic contours are to be effectively retained during the thrust period.

Accordingly, it is the broad object of the present invention to provide improved means and methods for cooling a surface which is to be subjected to very high temperatures.

A more specific object of this invention is to provide improved means and methods for cooling the nozzle of a solid propellant rocket.

An additional object of the invention is to provide the cooling means and methods of the foregoing objects in relatively simple and convenient form without requiring an excessive weight of coolant.

In accordance with the present invention greatly improved cooling effects are achieved in a simple and convenient manner by means of a hydrogen transpiration coolinng arrangement in which a metal hydride is used. as the coolant material from which the coolant hydrogen gas is derived. It has been found that such a hydrogen transpiration cooling arrangement not only achieves a remarkably effective cooling action, but in addition is self driving so that no external means are necessary.

The specific nature of the invention as well as other advantages, uses and objects thereof, will clearly appear from the following description and the accompanying drawing in which.

Like numerals designate like elements throughout the figures of the drawing.

Before considering the invention in detail, it should first be realized that although considerable theoretical investigations have been conducted with regard to improved techniques for cooling high temperature surfaces, it is still almost impossible to predict the performance of a particular cooling system without actual experimental tests. This is because the theoretical analysis of any particular system is not able to take into account all of the possible factors which may contribute to the actual performance which is finally achieved. The failure of theoretical considerations to adequately predict the success of possible cooling systems has been one of the factors which has made it so difficult to find a solution to the cooling problem where very high temperatures are involved, particularly where weight is at a preminm.

The improved cooling technique of the present invention involves a transpiration cooling method using a metal hydride coolant material in a manner which achieves the greatest possible cooling effect for a given amount of coolant material. Transpiration cooling is ordinarily defined as the method of cooling in which a fluid coolant passes through the wall of the surface being cooled in a normal direction, emerging on the flame side of the surface at or immediately upstream of the region being cooled.

Figure 1:
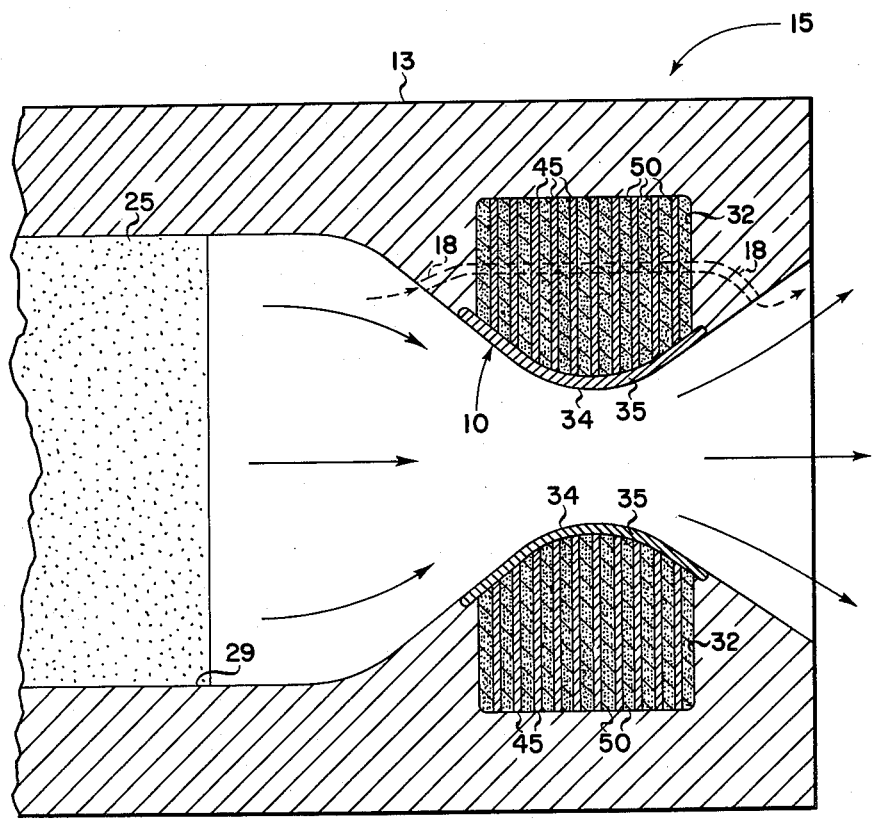
FIG. 1 is a partial longitudinal cross-sectional view of a solid-propellant rocket having a nozzle which incorporates the transpiration cooling means in accordance with the invention.

FIG. 1 shows how the transpiration cooling technique of the present invention can be applied to the cooling of the nozzle of a solid propellant rocket. In FIG. 1, the rear end of a rocket 15 is shown. The rocket 15 has a body 13 and a solid propellant 25 is suitably provided in a cavity 29 therein. The cavity 29 narrows to the shape of a nozzle 10 in order to suitably control the aerodynamic characteristics of the hot gases generated when the propellant 25 burns, as in a conventional rocket. The flow of gases to and from the nozzle 10 are illustrated by the arrows shown in FIG. 1. The particular shape of the inner surfaces of the nozzle 10 are determined by aerodynamic considerations.

In accordance with the invention the nozzle 10 comprises a porous metal tube 35 whose inner surfaces 34 are shaped to provide the desired aerodynamic contours for nozzle operation. The nozzle tube 35 is mounted in the body 13 of the rocket 15 by any suitable means, such as by force fitting, shrink fitting or other mechanical mounting arrangement. A sealed annular cavity 32 is provided in the rocket body 13 surrounding the exterior surfaces of the nozzle tube 35. Within this cavity 32 is provided a metal hydride 50 tightly packed between annular metal plates or partitions 45 extending from the nozzle tube 35 to the rocket body 13.

When the propellant 25 burns and hot gases are passed through the nozzle 10, the severe temperature of the gases and the extreme gas flow conditions within the nozzle cause the nozzle to be heated to very high temperatures. As the temperature of the inner surface 34 of the nozzle 10 increases, heat flux is transferred to the metal hydride 50 by convection and also by conduction through the annular metal partitions 45. These metal partitions 45 are not essential and may be replaced or supplemented by other conducting means, such as by the use of corrugated metal strips or honeycomb structures around which the metal hydride 50 may be packed. Also, corridors as illustrated by dashed lines 18 in FIG. 1 could be provided in the body 13 and metal hydride 50 to permit the hot gases in the cavity 29 to pass heat directly to the metal hydride 50.

When a temperature is reached which is sufficient to decompose the metal hydride 50, decomposition takes place causing hydrogen gas $H_2$ to be liberated which passes through the walls of the porous tube 35 by means of the pores therein to provide cooling. The liberation of hydrogen gas from the metal hydride 50 during decomposition and the passage of this hydrogen gas through the porous wall of the tube 35 results in producing a three-fold cooling effect which is highly significant. First, heat is absorbed in bringing the metal hydride 50 from the solid state to decomposition. Second, the hydrogen gas liberated upon decomposition of the metal hydride 50 flows through the pores of the porous metal tube 35 of the nozzle 10 to form a protective hydrogen boundary layer on the interior nozzle surface 34 which effectively blocks the heat flux flowing to the surface 34 from the hot gases within the nozzle 10. As a result, heat energy from the hot gases is transferred directly to the hydrogen boundary layer and is returned immediately to the main stream instead of flowing through the surface 34. The third cooling effect which takes place is a result of the disassociation of part of the hydrogen gas $H_2$ in the boundary layer 39 into monatomic hydrogen ($H_2 \rightarrow 2H$) which is an endothermic reaction and absorbs heat.

Figure 2:
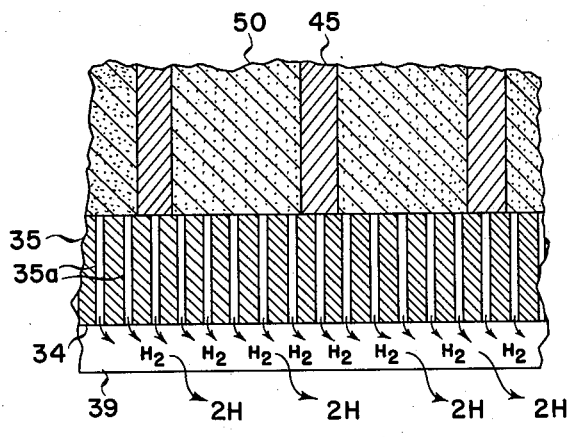
FIG. 2 is an enlarged cross-sectional and diagrammatic view of a portion of the nozzle shown in FIG. 1.

FIG. 2 is an enlarged cross-sectional and diagrammatic view showing a portion of the nozzle tube 35 and the surrounding metal hydride 50 packed between the metal partitions 45. The small passages 35a in FIG. 2 diagrammatically represent the pores in the porous tube 35. The flow of hydrogen gas $H_2$ through the metal tube 35 by means of these pores 35a is illustrated by the top row of arrows in FIG. 2. As explained previously, this flow of hydrogen gas forms a protective boundary layer indicated at 39, resulting in a mass transfer cooling effect which restricts the flow of heat flux to the surface 34.

The driving force for the flow of hydrogen gas is derived from the partial pressure gradient existing as a result of the pressure produced by the liberation of hydrogen from the metal hydride 50 and the free-stream pressure within the nozzle 10, and is sufficient to push the coolant hydrogen gas through the pores 35a of the nozzle wall 35 until the rate of liberation of hydrogen from the metal hydride 50 drops to a relatively low level. This is of considerable importance, since no external driving force is required as in many prior art cooling methods. Also, because a metal hydride has a high hydrogen content and the cooling cycle is self-driving, it is possible to achieve significant amounts of cooling with relatively small amounts of coolant material, which is most advantageous from a weight point of view, a factor of primary importance in a rocket or missile.

The particular metal hydride which is employed for a particular cooling job and the particular associated structure required will of course depend upon the environmental temperatures being dealt with, the amount of cooling desired, the time for which cooling is necessary and other practical considerations which may be peculiar to the particular application.

For cooling surfaces which are to be subjected to temperatures greater than 1500° Fahrenheit, four useful metal hydrides have been found. These are $LiH$, $LiBH_4$, $KBH_4$ and $NaBH_4$ and have melting or decomposition temperatures at one atmosphere of 1257° F., 536° F., 900° F., and 900° F., respectively. Of these the most advantageous metal hydrides for use in this invention has been found to be $KBH_4$ (potassium borohydride) because $KBH_4$ decomposes without going through a liquid phase, a unique property as compared to other hydrides. Not only does this unique property make the use of $KBH_4$ more convenient in a practical cooling scheme, but it appears to contribute to the total overall cooling which is achieved. The other three metal hydrides are also useful for cooling in accordance with the present invention and superior cooling is achieved with the use thereof as compared to known cooling techniques. In particular, the use of $LiH$ will probably be most advantageous for cooling surfaces which are to be subjected to very high temperatures because $LiH$ has the highest melting point. Also, any combination of these metal hydrides may be used and other materials could also be added for special effects if so desired.

Those skilled in the art will appreciate that there are various possible modifications and variations that may be provided in accordance with the hydrogen transpiration cooling scheme of the present invention which employs a metal hydride as the coolant material. For example, where severe heating problems are involved, the cooling method of the present invention may be combined with other cooling techniques. In addition, where continuous cooling is to be provided for a considerable period, means could be provided in a number of possible ways to permit the metal hydride to be continuously replenished. In a rocket, the burning time is relatively short (of the order of 100 seconds) and provision for replenishment of the metal hydride would not ordinarily be necessary.

If it is desired to protect the metal hydride coolant material 50 from the atmosphere during storage or prior to use, the porous surface 34 of the wall 35 of the nozzle 10 could be impregnated or surfaced with a plastic which would be destroyed during the initial stages of heating to initiate the cooling operation. Also, instead of using a porous tube 35 for the nozzle 10, a solid tube could be used which is drilled or slotted to permit the desired leakage of hydrogen gas therethrough. The term "porous" in the specification and claims is intended to include such drilled or solid tubes and surfaces.

Figure 3:
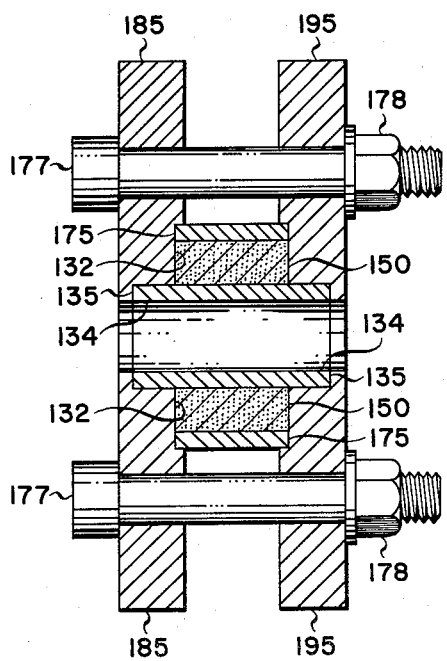
FIG. 3 is a cross-sectional view of a specific structural embodiment of the invention.

The superior cooling effect of the present invention has been demonstrated by means of the specific structural embodiment shown in FIG. 3. It is to be understood that the presentation of this specific embodiment is merely for illustrative purposes and is not to be considered as limiting the scope of this invention.

In the specific embodiment of FIG. 3 a metal hydride coolant 150 (without any metal partitions as in FIG. 1) is packed in a cavity 132 formed between two concentric tubes 135 and 175. These tubes 135 and 175 are suitably held in place by two end flanges 185 and 195 having bolts 177 passing therethrough on which are threaded nuts 178 as shown in FIG. 3. The inner tube 135 represents the nozzle tube 35 in FIG. 1 and is chosen with an outside diameter of 0.67 inch, an inside diameter of 0.37 inch, a length of 1.5 inches, and is made of porous iron with 20-percent porosity and an average pore diameter of 5 microns. The outer tube 175 has an outer diameter of about 2½ times that of the inner tube 135 and a somewhat smaller wall thickness. The outer tube 175 and the flanges 185 and 195 are of steel.

An acetylene torch (not shown) is used as a source of hot gas and the torch tip is kept at ⅝ inch from the nearest flange with its center line aligned with the longitudinal axis of the concentric tubes 135 and 175. The oxygen-acetylene ratio is adjusted so that a flame temperature of approximately 3,000° F. is produced and no excessive carbon is built up while impinging the torch flame on a flat surface.

Figure 4:
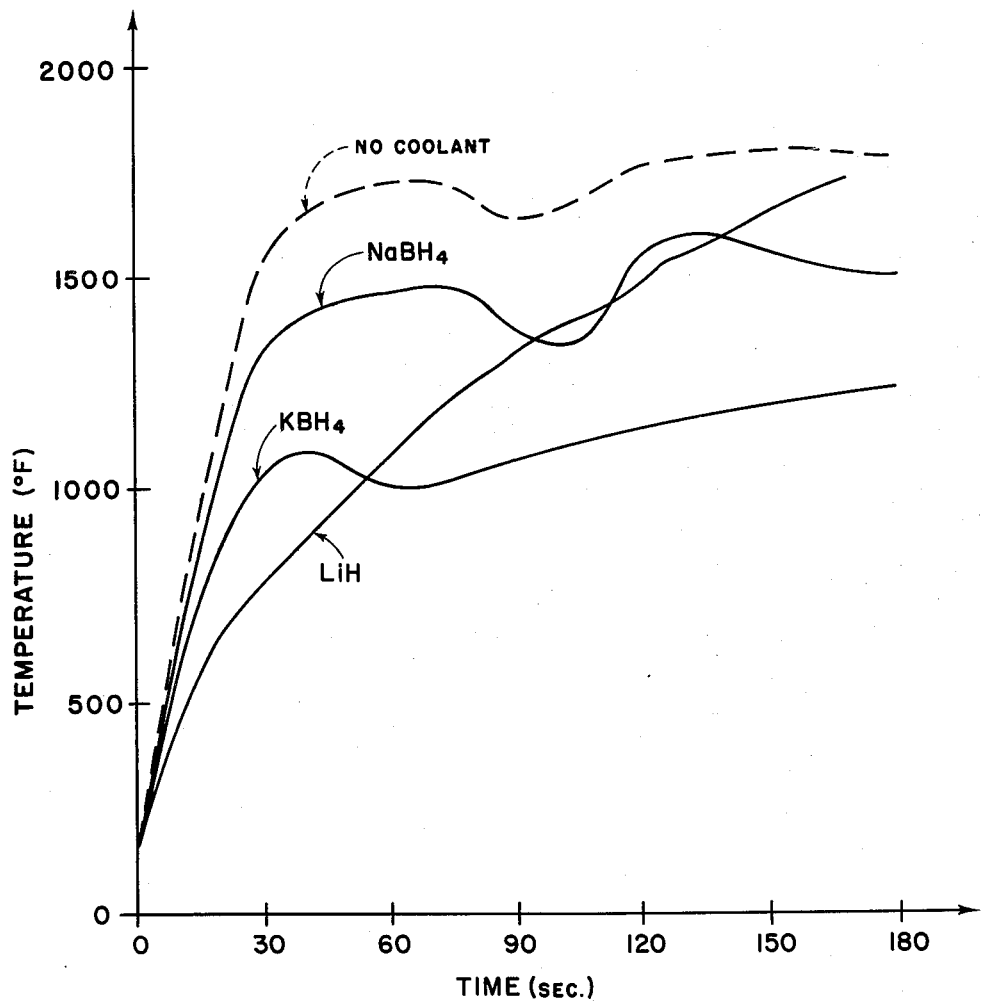
FIG. 4 is a graph showing curves which illustrate the superior cooling effect made possible in accordance with this invention.

The graph of FIG. 4 shows the curves obtained of the temperature of the inner surface 134 of the tube 135 versus the time of application of the hot gas from the acetylene torch for: (1) no metal hydride coolant material in the cavity 132, (2) 5.95 grams of the metal hydride $NaBH_4$ in the cavity 132, (3) 7.95 grams of the metal hydride $KBH_4$ in the cavity 132, and (4) 8.65 grams of the metal hydride $LiH$ in the cavity 132. From the graph of FIG. 4 it can be seen that a very significant reduction in the surface temperature of the surface 134 of the tube 135 is achieved. For the metal hydride $KBH_4$, a temperature reduction of more than 30-percent is obtained and the metal tube 135 remained intact after 180 seconds. The reduction in temperature using $NaBH_4$ is of the order of 14-percent and the metal tube 135 also remained intact after 180 seconds. The difference in cooling effect between $KBH_4$ and $NaBH_4$ is believed to be due to the excess leakage of the coolant $NaBH_4$ caused by $NaBH_4$ passing through a liquid phase before decomposing, whereas $KBH_4$ has no liquid phase.

When $LiH$ is used as the metal hydride 150, no equilibrium temperature is reached because of the relatively high melting temperature of $LiH$ and the tube 135 shows considerable erosion after 180 seconds.

However, it is expected that because of this high melting temperature, $LiH$ will be valuable for cooling surfaces which are exposed to very high temperatures in excess of the acetylene torch temperature of 3,000° F. used in obtaining the graph of FIG. 4.

The metal hydride $LiBH_4$ was not tested in the specific embodiment of FIG. 3 because of its extremely hygroscopic and pyrophoric nature, but if proper precautions are taken it is expected that a significant amount of cooling will be obtained because LiBH$_4$ has a higher hydrogen content per unit weight and a lower melting temperature than the other three metal hydrides.

It is to be understood that the hydrogen transpiration cooling system of the present invention may be used for a wide variety of purposes in addition to the cooling of a nozzle or other tubular member as described herein. For example, the invention could be advantageously employed to provide cooling in missile nose cones, jetevaters, jet vanes, and nozzle spoilers.

It will be apparent, therefore, that many modifications and variations may be made in the construction and arrangement of the embodiments described herein without departing from the spirit of this invention, and the invention is to be considered as including all possible modifications and variations coming within the scope of this invention as defined in the appended claim.

I claim as my invention:

A rocket motor having a discharge nozzle including a nozzle throat, a first section of enlarged cross-sectional diameter converging into said nozzle throat, a second section of enlarged cross-sectional diameter diverging from said nozzle throat, the walls of said first and second sections and said throat composed of a porous material, a first annular cavity disposed about said discharge nozzle and in communication with the interior surface of said porous material, a plurality of annular partitions disposed in spaced relation within said annular cavity thereby forming a plurality of second annular cavities between adjacent annular partitions, the small diameter surface of each of said annular partitions being in contact with the interior surface of said porous material, a plurality of metal hydride members separately disposed in each of said second annular cavities, an opening passing through each of said annular partitions and metal hydride members and interconnecting said first section with said second section of said nozzle, whereby exhaust gases passing through said opening and heat conducted by said annular partitions result in heating said metal hydride members to their decomposition temperature resulting in the liberation of hydrogen gas which passes through said porous material.

References Cited in the file of this patent

UNITED STATES PATENTS

| | | |
|---|---|---|
| 1,187,779 | Patten | June 20, 1916 |
| 2,354,151 | Skoglund | July 18, 1944 |
| 2,658,332 | Nicholson | Nov. 10, 1953 |
| 2,744,380 | McMillan et al. | May 8, 1956 |
| 2,908,455 | Hoadley | Oct. 13, 1959 |
| 2,922,291 | Fox et al. | Jan. 26, 1960 |
| 3,026,806 | Runton et al. | Mar. 27, 1962 |

FOREIGN PATENTS

| | | |
|---|---|---|
| 483,406 | Great Britain | Apr. 30, 1938 |

OTHER REFERENCES

Metals Plus Hydrogen (Johnson), Scientific American, volume 176, No. 3 of March 1947, pages 116, 117, 118.